April 16, 1946.    G. R. HENNEY ET AL    2,398,636
MEAT TREATMENT
Filed Aug. 4, 1942

Grover R. Henney
and John H. Johnson
INVENTOR

BY Roy G. Story
ATTORNEY

ATTEST-

Patented Apr. 16, 1946

2,398,636

UNITED STATES PATENT OFFICE 2,398,636

MEAT TREATMENT

Grover R. Henney, Chicago, and John H. Johnson, Belleville, Ill., assignors to Industrial Patents Corporation, Chicago, Ill., a corporation of Delaware Application August 4, 1942, Serial No. 453,506

22 Claims. (Cl. 99—107)

This invention relates to the treatment of meat, and has to do more particularly with the preparation of tenderized and shaped meat products such as cutlets or steaks.

One of the objects of this invention is to prepare a novel type of high grade meat product for the consumer.

Another object of this invention is to increase the yield of tender cutlets and steaks suitable for frying or broiling by treating meat from portions of animal carcasses which normally do not yield meat which is sufficiently tender for these uses.

A further object of this invention is to provide a method of tenderizing and knitting pieces of meat together whereby they may be cooked and eaten as steaks.

Another object of this invention is to provide a method of stretching and compacting superposed slices of meat into a unified mass so that during bending and deflecting of the meat mass incidental to handling as well as during cooking, it will retain its unified character.

A still further object of the present invention is to provide a method of stretching and compressing superposed slices of meat to produce a tenderized meat product.

Also an object of this invention is to preserve the color or bloom of fresh meat.

Other objects and advantages of the invention will be apparent from the following detailed description of what is now considered to be the preferred embodiment of the invention.

Heretofore, pieces of meat have been frozen, sliced into cuts of various thickness and recombined into a larger meat product, as by stacking several of the slices on top of each other and subjecting the stack to freezing. If the slices are sufficiently thin, some tenderizing effect is obtained when they are recombined. This method, however, produces a loaf comprising a plurality of slices which has neither the texture nor properties of an unsliced product, and which has a tendency to separate into individual slices during cooking processes.

It has also been proposed to compress a plurality of frozen pieces of meat together, but such products comprise a mass of discrete particles which are often so dissimilar in appearance as to be easily distinguishable, and which tend to separate when thawed or cooked.

It has also been proposed to extrude meat which has been previously conditioned by freezing through a die. This product is crumbly and entirely different in consistency and appearance from a fresh cut of meat.

In accordance with the present invention, the benefits of cutting the meat into thin slices may be obtained without the disadvantages of sacrificing the natural appearance and texture of the original piece of meat. Moreover, the present invention provides a product which is as tender as a comminuted product, but which retains much of the cohesiveness and texture of the original meat.

The method of the present invention in general comprises freezing pieces of meat contained in a form into a substantially solid block, thawing the frozen block of meat until it has a uniform temperature throughout suitable for slicing, slicing the meat into slices approximately one-quarter of an inch thick, folding a slice upon itself, or placing a plurality of separate slices together, and subjecting such superposed slices to the stretching and compressing action of a mechanical tenderizer to compress and knit the slices together into a tender and substantially unitary meat product.

The invention accordingly comprises the several steps and the relation of one or more of such steps with respect to each of the others thereof, which will be exemplified in the method hereinafter disclosed and the scope of the invention will be indicated in the claims.

For a fuller understanding of the nature and objects of the invention, reference should be had to the following detailed description taken in connection with the accompanying drawing, in which.

The present method involves the step of knitting together superposed sections or slices of meat. This knitting together of the superposed sections of meat is preferably accomplished during the tenderizing operation which may be effected by the use of any tenderizing machine which produces this knitting effect. A tenderizer which has been found to be satisfactory for this purpose is known as the "Zipper-Hussmann tenderizer," but it is to be understood that the method is not limited to the use of this particular tenderizer.

Figure 1:
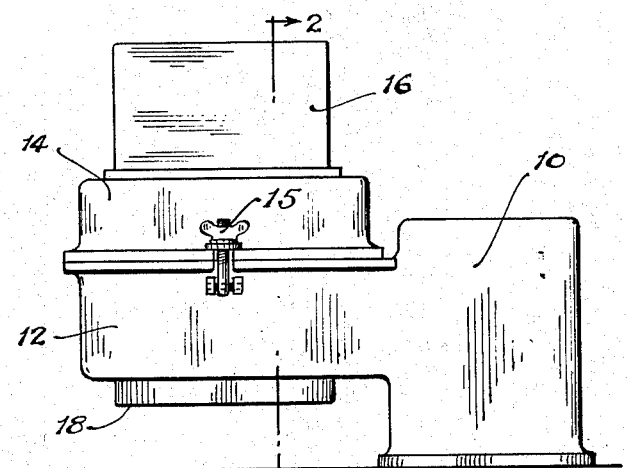
Fig. 1 is a side elevational view of an apparatus capable of use in the practice of the method of the invention.
Figure 2:
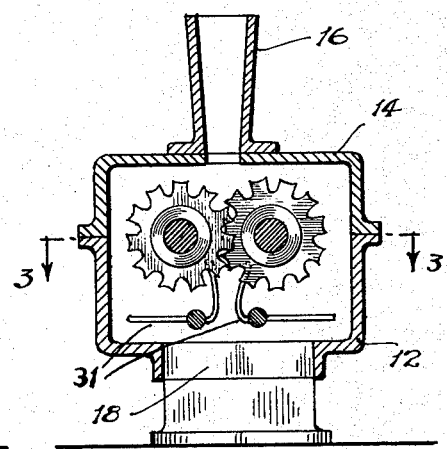
Fig. 2 is a sectional, elevational view of the apparatus of Fig. 1 taken substantially on the plane indicated by the line 2—2 of Fig. 1 and looking in the direction of the arrows.
Figure 3:
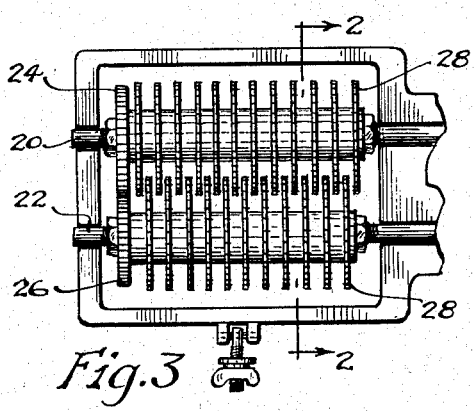
Fig. 3 is a horizontal sectional view of the apparatus taken substantially on the plane indicated by the line 3—3 of Fig. 2 and looking in the direction of the arrows.

A tenderizer of the above described type is illustrated in the drawing and comprises a suitable support or base 10 (see Figs. 1 and 2) which may contain a suitable driving motor. The base 10 also supports a casing 12 which forms the lower half of a meat treating chamber which is completed by an upper casing 14 suitably fastened to the lower casing by manually releasable fastenings 15. The upper housing 14 carries a meat entrance chute 16 and the lower housing 12 carries a meat outlet chute 18.

Figure 4:
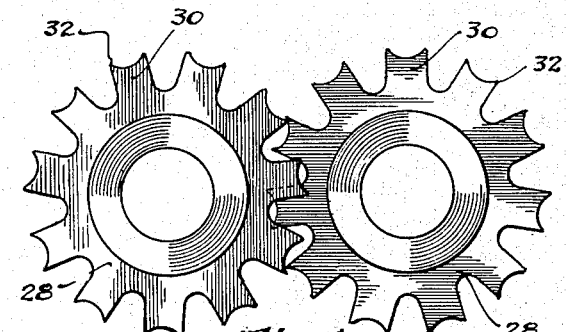
Fig. 4 is a fragmentary detailed view of two of the cooperative meat contacting members of the apparatus.

The meat treating chamber contains two shafts 20 and 22 journaled therein in suitable bearings and geared together by cooperating gears 24 and 26. One of the shafts 20 and 22 is driven by the motor through a suitable mechanical connection (not shown). The shafts 20 and 22 carry meat contacting members 28 which are in the form of star wheels provided with radial projecting teeth 30, each of which teeth is preferably provided at its outer extremity with a depression which forms two relatively sharp points 32 on the end of the tooth. The meat contacting elements 28 are rigidly fastened to their respective shafts 20 and 22 for rotation therewith and are positioned so that during rotary movement of the shafts the members 28 interleave but do not contact. The gear connection 24—26 is such that the teeth 30 of adjacent wheels always run out of register as illustrated in Fig. 4. A pair of combs 31 are suitably positioned within the meat treating chamber to prevent the meat from sticking to the meat contacting members 28.

By way of explanation and not in limitation of the invention, a preferred embodiment of the improved method will be described. The preferred embodiment comprises placing pieces of boned meat into a suitable form which may be a cardboard carton of suitable size. It has been found that a cardboard carton approximately 6 inches deep, 20 inches wide and 28 inches long will hold approximately 100 pounds of boned fresh meat. The meat is placed into the box so as to leave as few voids as possible and after the box is filled it is placed within a suitable confining form such as a wooden frame which fits the vertical sides of the cardboard box, a suitable closure such as a metallic plate is placed on top of the meat in the box and any desired amount of weight in the form of dead weights, other boxes of meat, etc., may be placed on top of the closure and the meat while under such pressure is subjected to a quick freezing process. The purpose of applying pressure to the meat is to diminish the size of the voids between the various pieces as much as possible so as to cause the meat to form a substantially solid block after it is frozen. The pressure causes some of the meat cells to rupture and the juices to be forced from the cells but the box and tight packing of the meat therein prevents these juices from escaping so that they are frozen with the meat. The temperature of the meat may be reduced as low as desired although unusually low temperatures are not necessary, and, therefore, not desirable because of additional cost.

Figures 5, 6, 7:
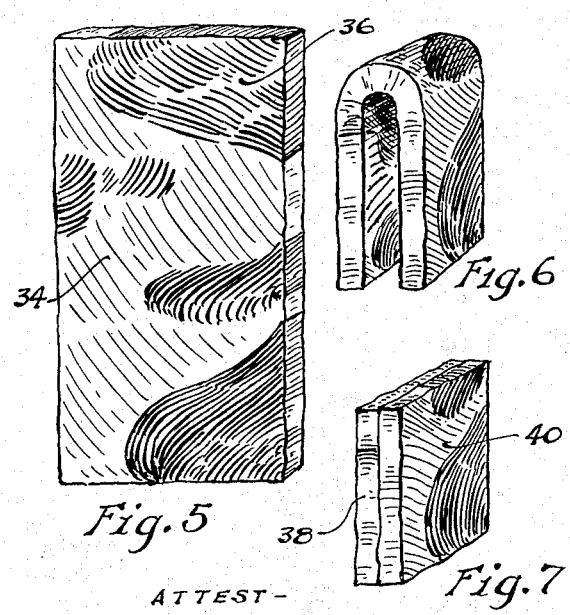
Fig. 5 is a perspective view of a slice of meat prior to being subjected to the tenderizing step of the method.
Fig. 6 is a perspective view of the slice of meat illustrated in Fig. 5 but after being folded over upon itself just prior to the tenderizing step of the method.
Fig. 7 is a perspective view of the folded meat slice illustrating how the folding operation causes the meat to break into two smaller slices.

After the freezing operation, the block of frozen meat is sawed into slabs of suitable size, for example, in the preparation of small steaks weighing several ounces each, the block is sawed vertically and lengthwise into slabs approximately 2½ inches wide. These slabs are then tempered in a cooler until the temperature of each slab is uniform, approximately 26° to 28° F. As soon as the slabs of the frozen meat have reached a uniform temperature of approximately 26° to 28° F. they are sliced in any desired type of slicing machine into slices approximately ¼ of an inch thick and 2½ inches wide by 6 inches long. Slices of this size weigh approximately ¼ of a pound which is usually a suitable size for marketing. These slices are further tempered until the temperature within the slice is uniform, approximately 28° to 30° F., at which time they will appear as shown in Fig. 5; that is, will comprise several pieces of meat frozen together and usually having their grains running in several different directions as shown at 34 and 36.

At a temperature of 28° to 30° F. the mass of meat in each of these small slices will be stiff but slightly pliable. Each of the slices is then folded over as illustrated in Fig. 6 and when the two halves of the slice are forced together, the slice usually fractures into two smaller slices or sections as illustrated at 38 and 40 in Fig. 7 with the grains of the pieces of meat making up the two slices running at angles to each other. It is contemplated that the slices or sections of meat as cut from the slabs may be placed together with one slice rotated through an angle of, for example, 10° to 90° with the other slice. This frequently occurs when during folding of the slices the two halves of a slice do not coincide which has the effect of partially rotating one of the halves relative to the other.

If a larger steak or cutlet is desired, or a smaller form is used, two or more slices may be subjected to the action of the tenderizing machine together, so that a plurality of slices will be knit into one piece. As many slices as desired may be placed together, either cross-piled with every other slice rotated through an angle to the adjacent slice or not, as desired.

As an alternative, the meat block may be originally cut into slabs, for example, half the size of those previously described as being cut from slabs so that the meat slices will be of the same size as the slices 38 and 40 without requiring any folding operation. Two or more of the slices are then stacked as previously described.

Figures 8, 9:
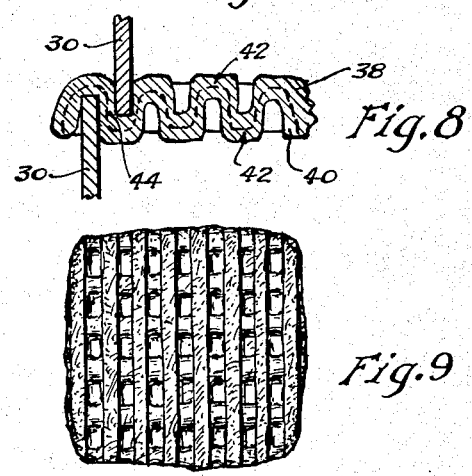
Fig. 8 is a fragmentary sectional view of the superposed slices of meat while they are being subjected to the tenderizing step of the method.
Fig. 9 illustrates the appearance of a finished meat product formed in accordance with the method of the present invention.

The stack of two or more slices of meat is then passed into the entrance chute 16 of the tenderizing machine and is caught by the meat contacting members and passed between them and is ejected from the machine through the outlet chute 18. During the passage of the meat between the cooperating meat contacting members, the pieces of meat are simultaneously tenderized and knitted together. This knitting and tenderizing function is more clearly illustrated in Fig. 8 wherein the slices of meat 38 and 40 are shown in cross section while in position between the cooperating pairs of meat contacting members. The teeth 38 of adjacent contacting members force localized areas of superposed meat slices inwardly from opposite sides of the stack of slices. These localized areas are illustrated at 42 in Fig. 8 and the portions of the meat slices 44 extending between the localized areas on opposite sides of the stack of slices are simultaneously stretched and compressed between the teeth 38 so as to break down tough sections of the meat and to compress the fibers in these portions of the superposed slices together to form a unitary product. As the superposed slices emerge from the tenderizing machine they have the appearance illustrated in Fig. 9.

In some instances, one passage through the tenderizing machine will not achieve the desired result, in which case the slices of meat are again run through the machine after being folded over upon themselves if desired. Only in rare instances will the second passage through the tenderizing machine fail to firmly knit the meat together into a steak of uniform thickness. In such instances a third treatment is necessary and the superposed slices may be again folded over upon themselves if desired before being passed through the tenderizer.

It has been found that the thickness of the meat slices tenderized in accordance with the present invention is of importance. It is preferable, although not essential, that the meat slices be of approximately one-quarter of an inch in thickness. This is due to the fact that very thin slices produce fibers which are so short as to make it difficult to bind the superposed slices together, and slices which are too thick are not as tender as thinner slices. Slices between ⅛ and ½ inch in thickness have been found to be satisfactory.

The temperatures at which the slicing and tenderizing operations are carried on are likewise important, particularly the temperature at which the meat is run through the tenderizing machine. A temperature of 26 degrees to 28 degrees F. is very desirable in the slicing operation in order that the meat will be quite firm. In the tenderizing treatment the temperature should be slightly higher so that the meat fibers will be slightly more pliable. However, if the temperature is elevated appreciably above 28 degrees to 30 degrees F., for example, above freezing, the operation will press an excessive quantity of the juices out of the meat. At the desired temperature the juices are still slightly frozen, and therefore, are not lost. In addition it has been discovered that tenderizing at this temperature gives the meat an attractive color or bloom which is retained for an appreciable length of time after defrosting.

After the small steaks have been subjected to the action of the tenderizing machine, they may be packed in suitable containers and again quickly frozen to a solid state. They may be kept in this condition for an indefinite time, and they will still retain their original flavor and appearance.

It is to be understood that other sizes and shapes of meat products may be produced in accordance with the method of the present invention, and that various types of meat may be so treated.

This application is a continuation in part of application Serial No. 346,802, filed July 22, 1940, entitled "Meat treatment."

Since certain changes may be made in carrying out the above method without departing from the scope of the invention, it is intended that all matter contained in the above description shall be interpreted as illustrative and not in a limiting sense.

The invention having been described, what is claimed is:

1. The described method of consolidating slices of meat for dispensing in a compact unit, which comprises slicing the meat into relatively thin portions, stretching the slices, and compressing the slices so as to compact them into a unit mass.

2. The described method of preparing meat, which comprises slicing the meat, and stretching and compressing defined, spaced areas of superposed slices, thereby compacting the slices into a unit for dispensing.

3. The described method of preparing a meat product, which comprises slicing the meat into relatively thin layers or slices, superposing the slices, and simultaneously stretching and compressing portions of the superposed slices.

4. The described method of preparing a meat product, which comprises slicing fresh meat, stretching and compressing portions of the slices, and stacking the slices in such manner that the grain of a given slice of meat is arranged at a substantial angle to the grain of an adjacent slice.

5. The described method of preparing fresh meats for consumption, which comprises slicing the meat into relatively thin layers or slices, cross-piling the slices and compacting the slices, by stretching and simultaneously compressing the slices, at least over parts of their whole areas.

6. The described method of preparing fresh meats for cooking and usage, which comprises subjecting the meat to a high external physical pressure, releasing the pressure, slicing the meat, cross-piling the slices, subjecting localized areas of the cross-piled slices to a substantial tension or stretch, and compacting the slices with the grain of each slice offset from the grain of meat of adjacent slices.

7. The described method of treating fresh meats to increase their uniformity of internal structure, which includes treating the meat to cause a rupture of at least some of the meat cells, thereby releasing a portion of the meat juices; slicing the meat under conditions to prevent appreciable loss of meat juices, cross-piling the slices, and effecting adhesion of the adjacent slices of meat for dispensing in loaf form, by compressing the slices upon one another while portions of the slices are under stretch or tension.

8. The described method of treating fresh meats to increase their tenderness and homogeneity and for uniformity in dispensing, which comprises confining the meat in a mold of a type to retain the meat juices, subjecting the meat in a mold to a determined physical pressure to release in part, the internal juices of the meat; hard-freezing the meat while in the mold and subjected to high physical pressure, thawing the meat sufficient to permit slicing, slicing the meat, cross-piling the slices thereof, stretching at least certain areas of the cross-piled slices, as a unit, and compressing the slices upon one another while said portions are under tension or stretch.

9. The method of producing a tenderized meat product, which comprises chilling the meat, slicing the meat into relatively thin slices, stretching spaced areas of a layer of slices in opposite directions while compressing the slices whereby the meat is tenderized and the slices knit together into a compact mass.

10. The method of treating meat which comprises slicing the meat, and subjecting a plurality of the resulting slices while chilled to stretching and compressing actions in a mechanical tenderizer to tenderize and knit the slices together.

11. The method of treating meat which comprises slicing the meat at a temperature low enough to produce sufficient rigidity in the meat to facilitate slicing and subjecting a layer of the resulting slices to mechanical tenderizing whereby the slices in the layer are stretched and compressed in localized areas to produce a tenderized unitary mass.

12. The method of treating meat, which comprises slicing the meat into relatively thin slices at a temperature at which the meat is substantially rigid, tempering the meat to remove at least some of the rigidity and subjecting a layer of the slices to stretching and compressing actions in a mechanical tenderizing operation whereby the meat is tenderized and the slices knit together.

13. A process for treating meat which comprises slicing the meat into relatively thin slices between one-eighth inch and one-half inch in thickness while frozen, thawing the slices to a temperature just below freezing, folding the slices, and passing the folded slices through a mechanical tenderizer, whereby the meat is tenderized and knitted together.

14. The method of preparing fresh meat which comprises freezing the meat into a solid mass, thawing the solid mass to bring the meat to a predetermined condition of rigidity to facilitate slicing, slicing the frozen meat into slices of approximately one-fourth inch in thickness, further thawing the sliced meat to bring it to the condition suitable for frenching or tenderizing, folding the sliced meat and running the folded piece through a tenderizing machine.

15. The method of preparing fresh meat which comprises freezing the meat into a solid mass, thawing the solid mass to bring the meat to a predetermined condition of rigidity to facilitate slicing, slicing the frozen meat into slices of approximately one-fourth inch in thickness, further thawing the sliced meat to bring it to the condition suitable to frenching or tenderizing the meat, folding the meat and running the folded piece through a tenderizing machine, and rechilling the same preparatory to holding for storage or for shipment.

16. The method of treating meat which comprises freezing a plurality of the pieces of fresh meat to form a frozen mass, tempering the frozen mass for a time sufficient to bring the meat to a suitable condition to facilitate slicing, slicing the frozen meat into slices approximately one-quarter of an inch thick, further thawing the sliced meat to a suitable condition of rigidity to facilitate frenching, folding the slice, and tenderizing or frenching the folded piece.

17. The method of treating meat which comprises freezing pieces of meat into a solid mass, thawing to a temperature of approximately 26 degrees to 28 degrees F., slicing the frozen meat into slices of approximately one-fourth inch in thickness, further thawing the sliced meat to a temperature of approximately 28 degrees to 30 degrees F., folding the meat and running the folded piece through a tenderizing machine, and rechilling the same preparatory to holding for storage or for shipment.

18. The method of preparing cutlets from relatively small pieces of meat, which comprises freezing the pieces of fresh meat to form a frozen mass, tempering the frozen mass to a temperature of approximately 26 degrees to 28 degrees F., slicing the frozen meat into slices approximately one-quarter of an inch thick, further thawing the sliced meat to a temperature of approximately 28 degrees to 30 degrees F., and subjecting a plurality of such slices to the action of a tenderizing or frenching machine whereby the meat is tenderized and knitted together.

19. The method of treating meat which comprises preparing a substantially frozen compact mass of a plurality of pieces of meat, slicing the frozen mass into slices at least about one-eighth inch thick and sufficiently thin to pass through a frenching or tenderizing machine, folding the slices into layers of thickness of at least two slices, and passing said layers through said frenching or tenderizing machine whereby the layers of meat are tenderized and knitted together to form integrated slices of tender meat.

20. The method of treating meat which comprises assembling a compact mass of relatively small pieces of fresh meat, subjecting the mass to temperatures sufficiently low to rigidify the meat to facilitate slicing, cutting said product into slices not exceeding about one-half inch in thickness, folding said slices into layers and subjecting said folded slices at temperatures below about 30° F. to mechanical tenderizing or frenching whereby the layers of meat are tenderized and knitted together to form slices of an integrated mass of tender meat.

21. The method of treating meat which comprises freezing a mass of relatively small pieces of fresh meat to form a product suitable for slicing, cutting the product into slices of about one-eighth inch to one-half inch in thickness, folding said slices into layers and passing said layers through a tenderizing or frenching operation whereby the layers of meat are tenderized and knitted together to produce steak-like slices of tender meat.

22. The method of treating meat which comprises slicing a mass of fresh meat composed of a plurality of relatively small pieces into slices of about one-fourth inch in thickness at a temperature of about 26 degrees to 28 degrees F., forming the slices into one or more folds and subjecting said folded slices at temperatures not above freezing to a tenderizing or frenching operation whereby the pieces of meat are tenderized and knitted together into steak-like cuts.

GROVER R. HENNEY.
JOHN H. JOHNSON.